United States Patent [19]

Shono et al.

[11] Patent Number: 4,759,784
[45] Date of Patent: Jul. 26, 1988

[54] METHOD OF MANUFACTURING GLASS FIBER STRAND

[75] Inventors: Hiroaki Shono; Kozo Shioura; Syuichi Yamazaki, all of Fukushima, Japan

[73] Assignee: Nitto Boseki Co., Inc., Fukushima, Japan

[21] Appl. No.: 943,821

[22] Filed: Dec. 29, 1986

Related U.S. Application Data

[62] Division of Ser. No. 821,601, Jan. 23, 1986, abandoned.

[30] Foreign Application Priority Data

Jan. 25, 1985 [JP] Japan .................................. 60-10800

[51] Int. Cl.$^4$ .................................. C03B 37/022
[52] U.S. Cl. .................................. 65/2; 65/1; 264/177.2; 428/399
[58] Field of Search .................. 65/1, 2; 428/397, 399; 264/177.2

[56] References Cited

U.S. PATENT DOCUMENTS

| | | | |
|---|---|---|---|
| 2,453,864 | 11/1948 | Schlehr | 65/1 X |
| 2,465,283 | 3/1949 | Schlehr | 65/1 |
| 2,965,925 | 12/1960 | Dietzsch, Sr. | 428/398 |
| 3,063,094 | 11/1962 | Warthen | 264/177 F |
| 3,095,258 | 6/1963 | Scott | 264/177 F |
| 3,231,459 | 1/1966 | Warthen | 428/397 |
| 3,425,454 | 2/1969 | Eakins et al. | 428/397 X |
| 3,573,014 | 3/1971 | Strickland et al. | 65/1 |
| 4,437,869 | 3/1984 | Lecron et al. | |
| 4,461,855 | 7/1984 | Phillips | 428/364 |
| 4,620,859 | 11/1986 | Lin et al. | 65/2 |
| 4,622,054 | 11/1986 | Huey et al. | 65/2 |
| 4,636,234 | 1/1987 | Huey et al. | 65/2 |
| 4,666,485 | 5/1987 | Huey | 65/2 |

FOREIGN PATENT DOCUMENTS

964459 7/1964 United Kingdom ................ 428/397

OTHER PUBLICATIONS

R. A. Humphrey, "Forming Glass Filaments with Unusual Cross Sections", pp. 77.1–77.8.

Primary Examiner—Robert L. Lindsay
Attorney, Agent, or Firm—Bert J. Lewen; Henry Sternberg

[57] ABSTRACT

A flat glass fiber strand comprises a multiplicity of glass filaments having a non-circular cross-sectional shape with the ratio between its maximum and minimum dimensions being between 1.2:1 and 3:1, and which are gathered in such a manner that one dimension of the cross-section of each extends in parallel with the same dimension of the other filaments. This flat glass fiber strand is manufactured by discharging molten glass under high pressure from a multiplicity of nozzles which are shaped in the form of bores having non-circular cross-sectional shape with the ratio between its maximum and minimum dimensions being between 1.5:1 and 6:1 so as to form a multiplicity of filaments of non-circular cross-sectional shape which are then gathered and wound.

7 Claims, 2 Drawing Sheets

METHOD OF MANUFACTURING GLASS FIBER STRAND

This application is a divisional of Ser. No. 821,601 filed Jan. 23, 1986, now abandoned.

BACKGROUND OF THE INVENTION

1. Field of the Invention

The present invention relates to a glass fiber strand formed from filaments having a non-circular cross-sectional shape and a method of manufacture thereof.

2. Description of the Prior Art

A fiber glass is generally manufactured by discharging molten glass from a bushing having a multiplicity of nozzles of circular cross-sectional shape so as to form a multiplicity of filaments. These filaments are then gathered into a strand, and the strand is then wound on a winder. As a result, each filament of fiber glass manufactured by this method has a circular cross-section. The thus manufactured fiber glass is mainly used as a material for incorporation in a thermosetting, thermoplastic resin, or the like as a means of reinforcement. Generally, the surface of the glass fiber is subjected to a treatment which provides bonding force at the interface between the glass fiber and the resin.

Recently, there has been a great demand for the strength of a composite material which includes resin and fiber glass to be increased. Additionally, it is increasingly being demanded that a thinner strand be used in the application of the continuous filaments which are used in filament winding, pultrusion as well as those for a roving cloth, an electrical insulating cloth and so forth.

SUMMARY OF THE INVENTION

Accordingly, an object of the invention is to provide a glass fiber strand and a method of manufacture thereof in which the glass fiber strand is improved in such a manner as to increase the strength of a composite material in which it is used as a reinforcing material and which has a flat configuration as a whole.

The present inventors made various studies in order to overcome the above-described problem and as a result found that in order to increase the strength of a composite material employing a relatively short chopped strand, it is essential to increase the bonding strength at the interface formed between a glass fiber and a resin, and that such an increase in bond strength cannot be achieved with a glass fiber having a circular cross-section as in conventional glass fibers, but can be attained with a glass fiber of a non-circular cross-sectional shape such as an oblong or an ellipse, i.e., of irregular shaped cross-section. It was further found that when the strand which is formed with a multiplicity of gathered filaments of any of the above-described cross-sectional shapes is running on a sizing applicating roller and a guide while being subjected to tension, all the filaments in a strand fall flat and are piled one on top of another, and a strand which is flatter than the conventional one (in which each of the filaments is aligned with the others in such a manner that the longer dimension of each lies parallel to that of the other filaments) is obtained.

The present invention is based on this knowledge, and a glass fiber according to the invention is adapted such as to have a non-circular cross-sectional shape with its maximum and minimum dimensions in the ratio of between 1.2:1 and 3:1.

It is to be noted that the above maximum and minimum dimensions designate the dimensions of the longer and shorter diameters in an ellipse or oblong or the dimensions of the longer and shorter sides in a rectangle, respectively. Since a glass fiber of non-circular cross-sectional shape having dimensions falling within such ratios is flat in shape, and therefore has a larger surface area than that of a glass fiber of circular cross-sectional shape, it is considered that it is able to offer a higher bonding strength between the glass fiber and the resin with which it is employed, thus providing a composite material with an improved reinforcing effect. If the ratio of the maximum to the minimum dimensions, (hereinafter referred to as a dimensional ratio), of a glass fiber of non-circular cross-section is 1.2:1 or smaller, a satisfactory effect caused due to non-circular cross-section cannot be obtained, and an adequate increase in the strength of a composite material cannot be achieved. Conversely, if the dimensional ratio is 3:1 or larger, effect of reinforcement of a composite material is increased but the fiber glass having such dimensions frequently has a ribbon-like form, disadvantageously leading to a frequent break-out or bend during winding, after-treatment processes and the like. For this reason, a fiber glass according to the present invention is defined as having a non-circular cross-sectional shape with the ratio between its longer and shorter dimensions selected to be between 1.2:1 and 3:1.

Methods of manufacturing a glass fiber strand consisting of a number of filaments of such a cross-sectional shape will be explained with reference to the accompanying drawings.

DESCRIPTION OF THE PREFERRED EMBODIMENTS

Figure 1:
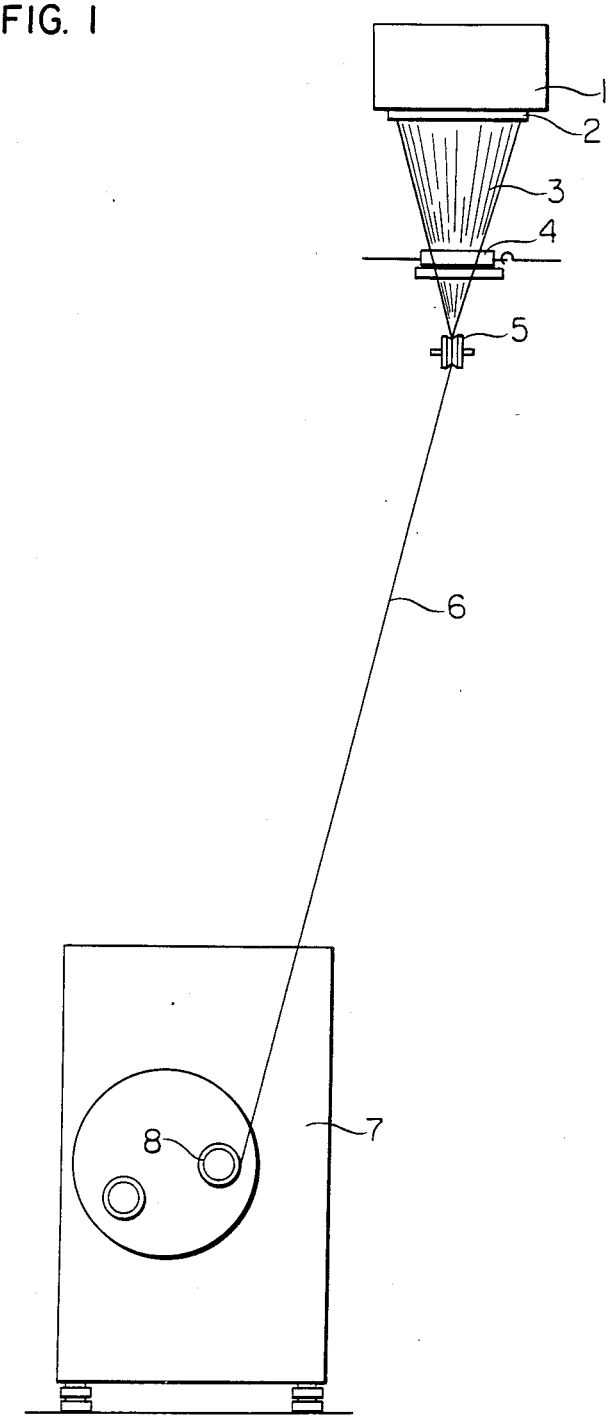
FIG. 1 is a schematic view of an apparatus for manufacturing a glass fiber strand according to the invention.
Figure 2:
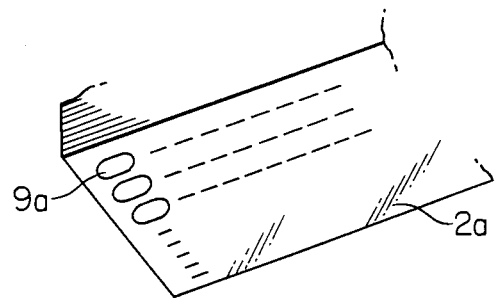
FIGS. 2 to 4 are perspective views of respective embodiments of the nozzle plate employed in the apparatus as shown FIG. 1.
Figure 3:
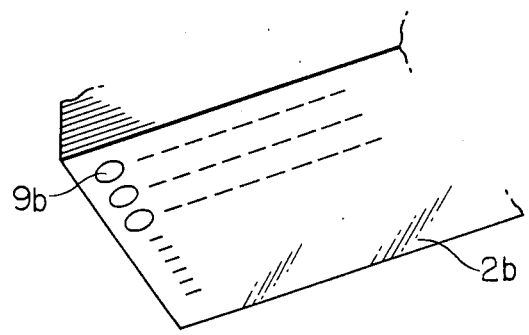
Figure 4:
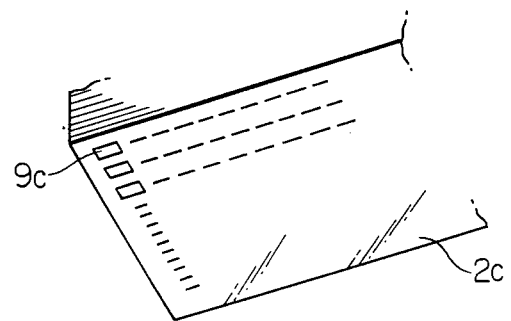

The manufacture of the above-defined glass fiber strand employs a bushing 1 which has its bottom a nozzle plate 2 having nozzles shaped in the form of bores of non-circular cross-sectional shape made up to have longer and shorter sides. For examples of such cross-sectional shape employed for the nozzles, FIG. 2 shows a nozzle plate 2a formed with nozzles 9a having a cross-sectional shape of an oblong, FIG. 3 shows a nozzle plate 2b formed with nozzles 9b having a cross-sectional shape of an ellipse, and FIG. 4 shows a nozzle plate 2c formed with nozzles 9c having a cross-sectional shape of a rectangle. It is to be noted, however, that it does not matter how each side of non-circular cross-sectional shape is shaped. These nozzle plates 2a, 2b, 2c are adapted to have a strength capable of withstanding far higher pressure than the usual head pressure of glass (about 0.03 Kg/cm$^2$, for example), which is a common practice in the discharge of molten glass in a conventional glass fiber production. By employing such a bushing 1, molten glass is discharged from the nozzles under high pressure so as to form a multiplicity of filaments 3. These filaments 3 then run over a sizing applicating roller 4 to be coated in the same manner as in the conventional method with sizing agents, are gathered through a gathering roller 5 into a strand, and are wound around a collet 8 of a winder 7. Thus, a glass fiber having an irregularly shaped cross-section such as an oblong or an elliptical cross-section is obtained.

In the manufacture of filaments having irregular shaped cross-section, it is very important for molten glass to be discharged from nozzles under high pressure. In the known manufacturing methods of glass fiber, however, molten glass is discharged from the nozzles, as described in the above, by virture of the head pressure of the molten glass. In a case of discharging molten glass solely by means of the head pressure, however, it is impossible to obtain filaments of irregular shaped cross-section and only filaments of circular cross-sectional shape are created, even if the nozzles are arranged such that its cross-sectional shape is in the form of a rectangle, an oblong, or other elongated form. It is assumed that this is because molten glass exhibits high surface tension and its cross-sectional shape thus becomes circular immediately after it is discharged from the nozzles despite the fact that they are of a non-circular cross-sectional shape. To meet this situation, the present invention contemplates to the discharge of molten glass under high pressure. An experiment of producing glass fibers in this manner confirmed that the glass fibers obtained are oblong or elliptical in their cross-sectional shape with the ratio between the longer and shorter dimensions being larger than 1, though this ratio is smaller than that of the dimensions of the cross-sectional shape of each nozzle. At this time, the viscosity of molten glass is made slightly higher (the temperature of molten glass is made slightly lower) so that an excessive amount of molten glass is not discharged. Preferably, a pressure of 0.3 kg/cm$^2$ or more is applied to molten glass (as measured at the nozzle inlet), since, if it is smaller than 0.3 kg/cm$^2$, it is not possible to ensure that the filaments will be irregularly shaped in their cross-section. Additionally, the strength of platinum rhodium alloy at elavated temperatures is not so large and when it is used as a material for a bushing, it is incapable of withstanding a pressure over 8 kg/cm$^2$. Therefore, from this point of view it is desirable to set the pressure lower than 8 kg/cm$^2$.

Various methods are available for applying high pressure to the molten glass discharged from the nozzles. In one of them, a glass bar is inserted into the bushing, and is pushed inwardly by means of a roller driven by a motor. In another method, glass marbles or cullets are supplied to the bushing by a ball valve and is hermetically sealed, while pressurized gas such as nitrogen is supplied or the glass material is pressurized by a compressor. It is not necessary, however, to employ any of the above-described pressurizing means if a pressure up to about 0.5 kg/cm$^2$ is all that is required. Necessary pressure may alternatively be obtained by providing the head of molten glass at a height of about 2 m.

It was found that the following relationship exists between the ratio of the longer to the shorter dimensions of the cross-sectional shape of a nozzle and the ratio of the longer and the shorter dimensions of the cross-sectional shape of the filament obtained therefrom. When a nozzle having a cross-sectional shape with a dimensional ratio of 1.5:1 is employed, the dimensional ratio of the cross-sectional shape of the filament obtained therefrom becomes about 1.2:1. A ratio of 6:1 for a nozzle ensures a ratio of about 3:1 for a filament. Thus, the cross-sectional shape of a nozzle employed in the method of manufacture of glass fiber strand according to the present invention is defined as having its dimensional ratio falling within the range between a ratio of 1.5:1 and a ratio of 6:1.

A multiplicity of flat shaped filaments 3 are gathered into a strand 6, after being discharged from the above-described nozzles of irregular shaped cross-section, and are then wound on a winder 7. During that time, the filaments are conveyed on a sizing applicating roller 4, each of the filaments 3 being aligned with the others in such a manner that the longer dimension of the cross-sectional shape of each lies parallel to that of the other filaments. This enables a flatter and broader strand to be obtained compared with the conventional one which is formed with filaments having a circular cross-sectional shape.

The thus obtained strand was employed as a chopped strand for reinforcing thermoplastics, and the resulting reinforced plastic showed an increase in tensile strength of 10 to 15%. Additionally, when this strand was woven into a textile, the resulting textile was capable of being made two thirds the thickness of the conventional one.

EXAMPLE

Glass fibers were produced employing nozzle plates (thickness 1.5 mm) having nozzles in the shapes shown in the table below, and the resulting glass fibers were able to assume the irregular shaped cross-sections shown in the table below.

|  | Embodiment 1 | Embodiment 2 | Embodiment 3 |
|---|---|---|---|
| Nozzle | | | |
| Shape | Oblong | Rectangle | Oblong |
| Longer Diameter mm | 0.9 | 1.0 | 1.2 |
| Shorter Diameter mm | 0.3 | 0.7 | 0.2 |
| Ratio of Longer to Shorter Diameter | 3:1 | 1.5:1 | 6:1 |
| Pressure Applied to Molten Glass (kg/cm$^2$) | 3.5 | 0.5 | 8.0 |
| Temperature of Molten Glass | 1210° C. | 1230° C. | 1190° C. |
| Filament | | | |
| Longer Diameter $\mu$ | 12.0 | 11.0 | 13.8 |
| Shorter Diameter $\mu$ | 7.2 | 9.2 | 4.6 |
| Ratio of Longer to Shorter Diameter | 1.7:1 | 1.2:1 | 3:1 |

Note: The temperature of molten glass was measured at a point 10 mm above the nozzle.

As will be understood from the foregoing description, the present invention makes it possible to manufacture a glass fiber having irregular shaped cross-section with the ratio between its maximum and minimum diameters, i.e., its longer and its shorter dimensions falling within the range of between 1.2:1 and 3:1. The thus produced glass fiber which is irregularly shaped in its cross-section has an increased specific surface compared to the conventional glass fiber of circular cross-sectional shape, and therefore provides for a stronger bonding with a resin when it is used as a reinforcing material of a composite material, thereby increasing the strength of the composite material. Additionally, it is possible to use this type of glass fiber to obtain a strand which is thin and has a greater width which can be used for manufacturing a thin textile.

What is claimed is:

1. A method of manufacturing a flat glass fiber strand which comprises: discharging molten glass from a multiplicity of nozzles to form a multiplicity of filaments having an elongated cross-section at a nozzle inlet pressure of at least 0.3 kg/cm$^2$, said nozzles being shaped in the form of a bore having an elongated cross-section with the ratio of the maximum dimension to the minimum dimension being from 1.5:1 to 6:1; gathering and winding said filaments so that one of the aforesaid dimensions of each filament extends essentially parallel to the same dimension of all of the other filaments.

2. A method of manufacturing a glass fiber strand according to claim 1, wherein the cross-sectional shape of said nozzle is oblong.

3. A method of manufacturing a glass fiber strand according to claim 1, wherein the cross-sectional shape of said nozzle is elliptical.

4. A method of manufacturing a glass fiber strand according to claim 1, wherein the cross-sectional shape of said nozzle is rectangle.

5. The method of claim 1 wherein the discharge temperature of the filaments is adjusted so that the viscosity of the molten glass is sufficiently high to prevent the filament from assuming a circular cross-section after discharge.

6. The method of claim 5 wherein the cross-sectional ratio of the maximum to the minimum dimension of the wound filament is from 1.2:1 to 3:1.

7. The method of claim 5 wherein the molten glass is at a temperature of from about 1190° C. to 1230° C.

* * * * *